United States Patent [19]

Salaman

[11] 4,439,672

[45] Mar. 27, 1984

[54] CONTROL SYSTEM FOR AUTOMATED MANIPULATOR DEVICE

[75] Inventor: Roy G. Salaman, Boulder, Colo.

[73] Assignee: Lord Electric Company, Inc., New York, N.Y.

[21] Appl. No.: 402,994

[22] Filed: Jul. 29, 1982

Related U.S. Application Data

[63] Continuation of Ser. No. 132,272, Mar. 20, 1980.

[30] Foreign Application Priority Data

Aug. 7, 1981 [DE] Fed. Rep. of Germany ....... 3131276

[51] Int. Cl.[3] ........ G01F 7/10

[52] U.S. Cl. ........ 235/463; 235/462; 235/487; 235/451; 235/494; 250/231 R; 250/231 SE

[58] Field of Search ........ 235/487, 462, 463, 466, 235/494, 473, 472, 456, 454, 455, 458, 474, 492, 380, 382, 493, 488; 250/237 R, 231 R, 231 SE

[56] References Cited

U.S. PATENT DOCUMENTS

| | | | |
|---|---|---|---|
| 2,995,506 | 8/1961 | Baldauf et al. | 204/193.4 |
| 3,806,706 | 4/1974 | Hasslinger et al. | 235/466 |
| 3,818,189 | 6/1974 | Stone et al. | 235/454 |
| 3,947,843 | 3/1976 | Presentey | 235/454 |
| 4,004,131 | 1/1977 | Oneil, Jr. et al. | 235/463 |
| 4,011,448 | 3/1977 | Hordeski | 250/237 |
| 4,110,610 | 8/1978 | Mueller et al. | 250/231 |
| 4,110,611 | 8/1978 | Tann et al. | 250/237 |
| 4,136,957 | 1/1979 | Uno et al. | 356/394 |
| 4,143,267 | 3/1979 | Johnson et al. | 250/231 |
| 4,179,621 | 12/1979 | Crean et al. | 235/454 |
| 4,216,868 | 8/1980 | Geppert | 212/155 |

OTHER PUBLICATIONS

IBM T.D.B. vol. 9, No. 12, 5/67, p. 1755.

IBM T.D.B. vol. 23, No. 6, 11/80, p. 2354.

*Primary Examiner*—G. Z. Rubinson
*Assistant Examiner*—Robert Lev
*Attorney, Agent, or Firm*—John R. Ley

[57] ABSTRACT

A control system controls the movement and position of an automated device as it moves along a movement track. The control system comprises a chart extending stationarily transversely adjacent along an operative portion of the movement track which includes a light reflective code uniquely defining each increment of length of the chart. A light source is carried by the movement device for illuminating the chart and creating the reflected optical signals. A camera device is also carried by the movement device and receives the optical signals. Corresponding electrical signals are derived and are utilized by a computer processor to control the position and movement of the movement device. The chart includes a plurality of parallel bars extending along the length of the chart. A portion of the bars define, in binary code, the unique optical signal reflected from each distance increment along the chart. A remaining portion of the bars assure the integrity of the reflected optical signal.

16 Claims, 8 Drawing Figures

86
88
92
94
96
102
104
24

90

OUTPUT PULSES FROM CLOCK 150

VIDEO PULSE DATA ON CONDUCTOR 112

DEMODULATED BAR DATA ON CONDUCTOR 116

TRIGGER SIGNAL TO SYNCH WINDOW COUNTER ON CONDUCTOR 198

SYNCH WINDOW PULSE ON CONDUCTOR 120

VALID SCAN SIGNAL ON CONDUCTOR 122

CENTER BAR SAMPLE SIGNAL ON CONDUCTOR 222

DECODE ENABLE SIGNAL ON CONDUCTOR 194

DATA BITS TO INTERFACE ON CONDUCTOR 230
TIME

CONTROL SYSTEM FOR AUTOMATED MANIPULATOR DEVICE

This application is a continuation of U.S. patent application Ser. No. 132,272, filed Mar. 20, 1980, for "System for Controlling Position and Movement of Manipulator Device From Absolute Distance Data Standard", now U.S. Pat. No. 4,385,028 issued May 24, 1983, assigned to the assignee hereof.

This invention pertains to a position and movement control system for a manipulator or automated device, for example, a crane or X-Y positioning machine. More particularly, the present invention pertains to controlling and positioning the automated device based on measurements and signals obtained from encoding an absolute distance standard such as a coded strip chart or the like having a uniquely different pattern for each increment of position or distance. The present invention is particularly applicable for use in controlling a manipulator crane used for handling fuel and core elements in a nuclear reactor.

Many previous manipulator and automated devices operate on a differential or relative movement principle. Such prior art systems involve encoders and incremental counters for sensing and measuring the number of incremental steps or distances of movement from an initially established reference position. At any time the incremental counter reflects the number of incremental units the device has moved from its initial reference position. Reliable operation of the system is thus completely and totally dependent on establishing and maintaining the initial reference position.

If the initial reference position is lost or changed in such prior art systems, the total system must be completely reprogrammed or reorganized. Loss of the initial reference position can and does occur, under such exemplary circumstances as power failures, static noise bursts, service and maintenance to mechanical components of the system and upon first starting a newly installed prior art device.

SUMMARY OF THE INVENTION

One of the significant aspects of the present invention is that it operates based on an absolute distance or measurement standard, as opposed to the prior art relative standard which depends upon an initial reference position and differential incremental measurements based on the initial reference position. In accordance wit this concept of an absolute measurement standard, a coded strip chart is permanently positioned adjacent to each movement track of the manipulator device. The strip chart includes a unique pattern formed thereon at each preselected distance measurement increment. A position transducer is carried by the manipulator device to sense the uniquely coded distance measurement increments of each strip chart. As the manipulator device moves relative to the stationarily and absolutely positioned strip chart, each transducer supplies signals indicative of each uniquely coded distance increment sensed. The signals from each transducer are supplied to a computer processor which, under appropriate programming, control and operation, automatically controls the mechanical movement of the manipulator device.

A binary coded strip chart of small physical dimensions, for example, can define along its length, a large number of uniquely coded, very short distance measurement increments. Of course, by decreasing the physical distance between sequential increments, the manipulator device can be positioned more precisely and with higher tolerances and resolution than if more widely physically spaced distance measurement increments are sensed. Prior art differential movement encoders which incrementally count whole or partial revolutions of movement wheels, physical indentions on a movement track, teeth on a gear, links on a chain or other such commonly used incremental intervals, are substantially incapable of the high degree of resolution obtainable by the use of a binary coded strip chart in accordance with the present invention.

The strip chart preferably employed in the present system includes a plurality of parallel longitudinally extending bars. The bars and segments of the bars exhibit different light reflectivity characteristics. A sample bar extends along one transverse side of the chart and includes a plurality of uniform length and evenly spaced sample segments separated by uniform length transition segments. The sample and transition segments are of alternately different light reflectivity characteristics. The linear distance along the strip chart between each adjacent pair of sample segments defines the distance measurement increment. A plurality of data bars extend adjacent the sample bar. The data bars include longitudinal segments of different light reflectivity characteristics. The length of the data bar segments and the characteristics of the segments directly transversely perpendicular from each sample segment on the sample bar define a binary code which absolutely and uniquely references each distance measurement increment. The segments of the data bars change from one light reflectivity characteristic to another at points transversely perpendicular from the transition segments of the sample bar along the length of the chart. The signals derived by sensing the data bars at each sample segment are supplied to the computer processor and are used in controlling the manipulator device.

Each position transducer preferably employed in the present system is of the photoelectric type and provides the degree of optical precision necessary to optically observe the bars of the strip chart at each uniquely coded sample segment or measurement increment on the strip chart and convert the light reflectivity characteristics of the bars into electrical signals. The photoelectric transducer preferably includes a linear array of photodiodes upon which light reflected from a narrow path transversely perpendicular across the strip chart is focused. The array of photodiodes converts optical signals reflected from the bars and segments of bars into a series of electrical signals supplied in a sequence beginning with the bars adjacent the sample bar and progressing through the data bars.

The linear array of photodiodes and the associated circuitry which supplies the sequence of electrical signals in relation to the optical signals received from the bar chart defines a camera means. Signals from the camera means are supplied to a signal demodulator means. The signal demodulator means demodulates signals supplied from each individual photodiode into a signal generally representative of each bar of the chart. These bar signals are supplied to a conditioning circuit means and then to the computer processor. In addition, the signal demodulator examines the signals from the camera means to determine at what point along the length of the strip chart that the optical signal is reflected. Should the optical signal be reflected from a point within a narrow band extending transversely across the strip chart and through a transition segment of the sample bar, the signal demodulator means operatively controls the conditioning circuit to prevent the conditioning circuit from supplying the data bar signals to the computer processor. If the signal demodulator circuit detects that the optical signal to the camera means is obtained from a narrow transverse path extending tranversely across the strip chart through a point in one of the sample segments of the sample bar, the conditioning circuit is operatively controlled to supply the data bar signals to the computer processor.

Since the signal demodulator checks the points at which the strip chart is decoded and prevents signals from points transversely perpendicular from the transition segments from being coupled to the computer processor, there is a high probability that reliable signals from the data bars will be obtained. To even further increase the accuracy and reliability, the light reflected from the path transversely perpendicular across the strip chart is very narrow, and the narrowness of this path is substantially less than the length of each sample segment of the sample bar. Consequently, only a limited length of each sample segment is utilized to obtain the electrical signals representative of the light reflectivity characteristics of the data bars. As a result, the possibility that any invalid data obtained from the points where the segments of the data bars experience transitions is essentially eliminated.

The computer processor exercises control over the system in accordance with the distance measurement signals and its programming. Accordingly, the manipulator device can be automatically moved to a series of preselected positions, can be moved in a manner to avoid protected areas or areas in which obstacles are present, among many other advantageous functions.

Details of a preferred embodiment of the present invention are available from the following detailed description of the preferred embodiment taken in conjunction with the accompanying drawings, which are next briefly described.

DESCRIPTION OF THE PREFERRED EMBODIMENT

Figure 1:
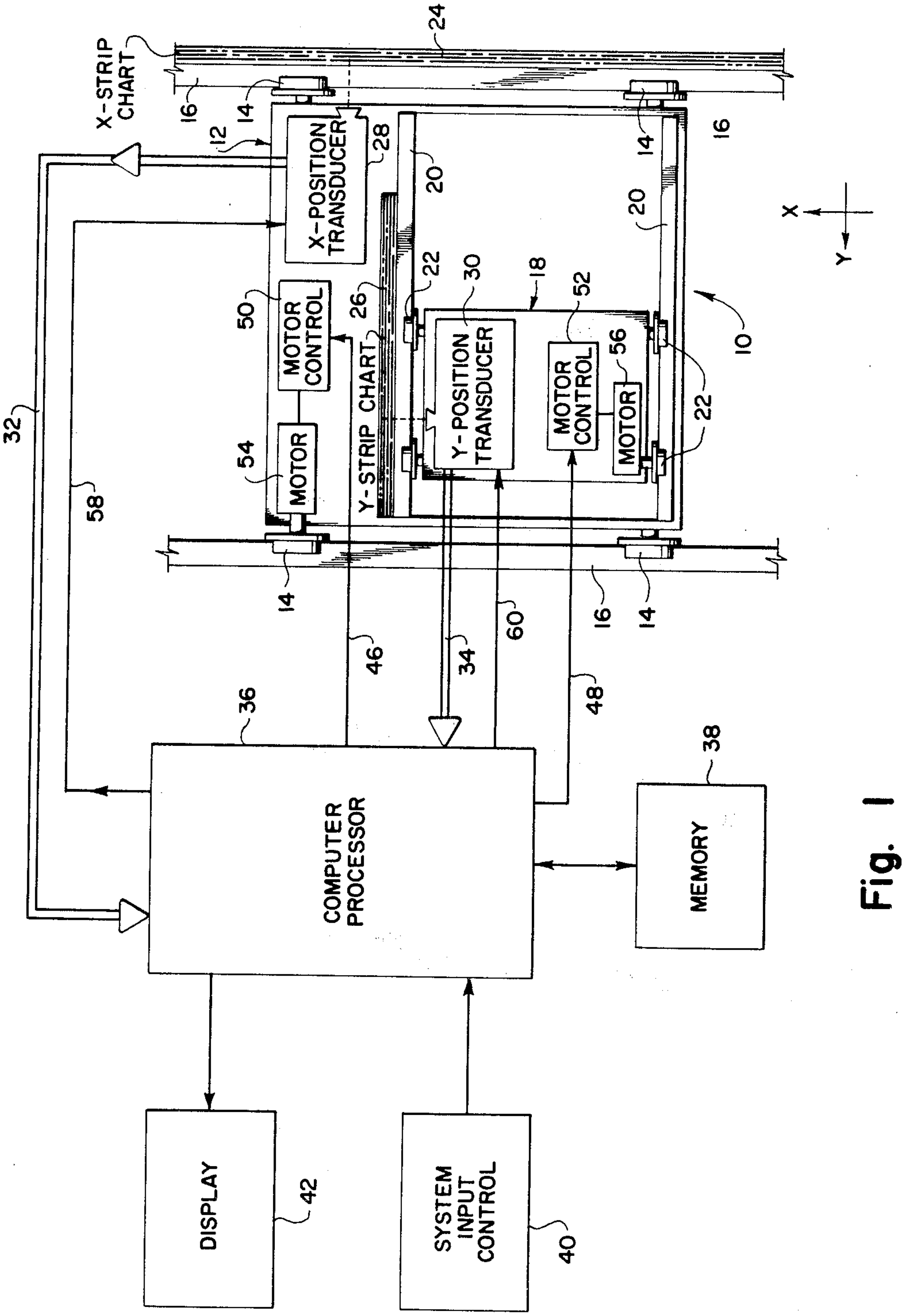
FIG. 1 is a schematic view of the control system of the present invention illustrating the major components of the system in block diagram and schematic form.

The system of the present invention generally controls the movement and position of a manipulator device 10 in at least one but preferably two directions or dimensions, as shown in FIG. 1. The manipulator device 10 includes a bridge assembly 12 to which a plurality of rollers 14 are attached. The rollers 14 move or traverse along a movement way or track 16 in a first direction or dimension, arbitrarily referenced an X dimension. A trolley assembly 18 is movably connected to the bridge assembly 12, and moves along movement ways or tracks 20 by a plurality of rollers 22 attached to the assembly 18. The movement tracks 20 are securely attached to the bridge assembly 12 and extend generally perpendicularly with respect to the movement track 16. The direction of movement of the trolley assembly 18 is parallel to an arbitrarily designated Y dimension perpendicular to the X dimension. Equipment attached to the trolley assembly 18 can thus be moved in a plane defined by the X and Y dimensions upon movement of the bridge assembly 12 and trolley assembly 18.

Movement of the bridge and trolley assemblies is determined and controlled in relation to information formed or engraved on an X-dimension code strip or strip chart 24 and a Y-dimension code strip or strip chart 26. The X-dimension strip chart 24 is permanently and stationarily attached relative to the X-dimension movement track 16. Similarly, the Y-dimension strip chart 26 is permanently and stationarily attached to the bridge assembly 12 adjacent to the Y-dimension movement track 20. Information formed or engraved on the strip charts 24 and 26 defines uniquely coded distance measurement increments at every increment of length along the strip charts.

An X-dimension position transducer 28 is connected to the bridge assembly 12 and is positioned in operative relation to the X-dimension strip chart 24 for sensing or transducing the information indicative of the X-dimension distance measurement increments on the strip chart 24. Similarly, a Y-dimension position transducer 30 is attached to the trolley assembly 18 in operative relation to the Y-dimension strip chart 26 for sensing or transducing the information indicative of the Y-dimension distance measurement increments on the Y-dimension strip chart. As the bridge assembly 12 moves along the X-dimension movement track 16, and as the trolley assembly 18 moves along the Y-dimension movement track 20, the position transducers 28 and 30 respectively sense information on the strip charts 24 and 26 and provide signals indicative of movement of the bridge and trolley assemblies in the X and Y dimensions.

Signals representative of the measurement increments along the strip charts 24 and 26 are supplied over data busses 32 and 34 from the position transducers 28 and 30, respectively, to a computer processor 36. The computer processor 36 is a conventional microcomputer processor to which there is electrically connected the typical microcomputer peripheral equipment including a memory 38, a system input control 40 and a display 42. The computer processor 36 has been appropriately programmed to control the position and movement of the manipulator device 10 in response to the measurement increment signals received. After appropriate processing based on the measurement increment signals, the computer processor 36 operatively delivers motor control signals over conductors 46 and 48 to motor controls 50 and 52 respectively. The motor controls 50 and 52 are respectively connected to control motors 54 and 56. Each motor control 50 or 52 receives the computer generated motor control signals and applies a signal in a form appropriate for directly operating its directly connected and associated motor 54 or 56, respectively. The motor 54 is operatively connected to rotate one or more of the rollers 14, and the motor 56 is operatively connected to rotate one or more of the rollers 22. Thus, the computer generated motor control signals on conductors 46 and 48 operatively cause the motors 54 and 56 to respectively move the bridge assembly 12 in the X dimension and to move the trolley assembly 18 in the Y dimension. In this manner, a device connected to the trolley assembly 18 can be positioned at any point along the X and Y dimensions. In addition, the computer processor 36 supplies various conventional control signals to the X and Y position transducers 28 and 30 over control conductors 58 and 60, respectively. The control signals on conductors 48 and 60 control the operation of the position transducers 28 and 30 respectively, during the process of sensing the information on the strip charts, converting the information sensed into related signals appropriate for use by the computer processor, and delivering the signals over the data busses 32 and 34 to the computer processor 36.

Although the invention is described in its preferred application with a manipulator crane or device for use in manipulating nuclear core elements, the broader aspects of the present invention are applicable to automated manipulator devices, irrespective of the application.

Figure 2:
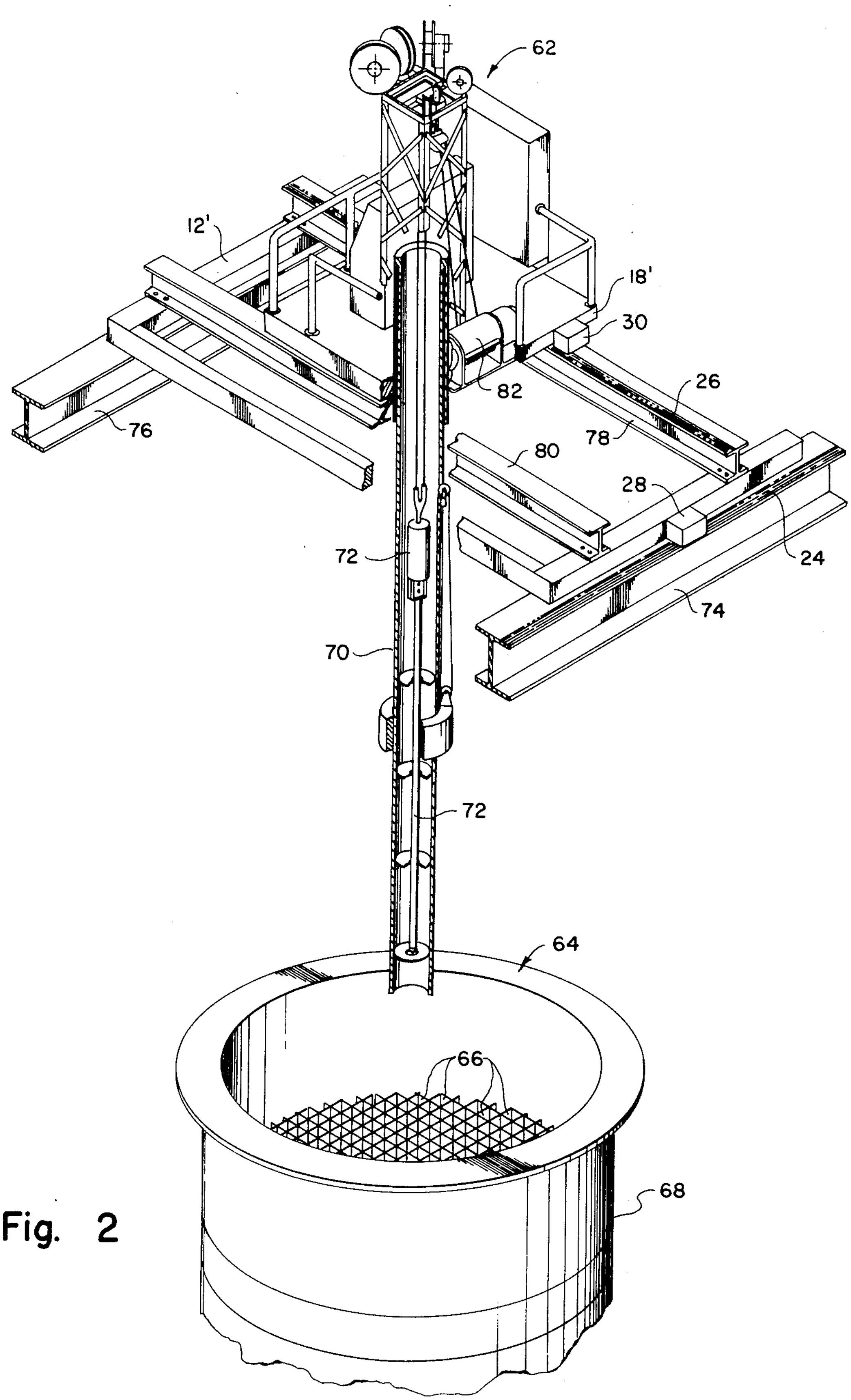
FIG. 2 is a perspective view of one example of a manipulator device to which the present invention is applicable. Shown in FIG. 2 is a perspective view of a nuclear manipulator crane movable on a trolly assembly and a bridge assembly and shown positioned above a core area within which individual core cells of a nuclear reactor are located.

One particular form of the manipulator device 10 to which the present system is particularly well adapted is a manipulator crane 62 illustrated in FIG. 2. The manipulator crane 62 is suspended above a core area 64 of a nuclear reactor. The core area 64 includes a plurality of core cells or receptacles 66 positioned at predetermined locations within a reactor pool 68 of the core area 64. Each core receptacle 66 is intended to receive various well known nuclear core elements such as fuel assemblies, control rods and orifice rods, none of which are specifically shown. It is the general function of the manipulator crane 62 to automatically insert and withdraw the various core elements within the core receptacles 66 without human contact.

In order to manipulate the core elements within the core receptacles 66 the manipulator crane includes a downward extending hollow mast 70 within which a grapple assembly 72 is longitudinally movable. The grapple assembly 72 includes means for gripping or connecting with the various core elements located within each core receptacle 66.

To operate the manipulator crane 62, the mast is first positioned directly above the core receptacle 66. A high tolerance for accuracy is required in positioning the mast 70 so the grapple assembly can properly and adequately grip the core elements within the core receptacles. This tolerance for accuracy must typically be within 0.060 inch and preferably should be 0.020 inch. After proper positioning, the mast 70 and grapple assembly 72 are extended downward and the grapple assembly connects to an upper end of one of the core elements within the core receptacle over which the mast has been positioned. Thereafter, the grapple assembly is moved upward into the mast and the core element from the core receptacle is lifted into the hollow portion of the mast. The manipulator crane is moved to a position where the core element is to be stored or transferred in a transfer area, not shown.

The manipulator crane 62 includes a bridge assembly 12' and a trolley assembly 18' similar in all essential functional respects to those assemblies 12 and 18, respectively, described in conjunction with the manipulator device 10 shown in FIG. 1. Movement ways or tracks 16' for the bridge assembly 12' are provided by ways or support structures such as parallel beams 74 and 76. Similarly, support structures such as beams 78 and 80 are attached to the bridge assembly 12' and define the movement tracks or ways 20' for the trolley assembly 18'. The X-dimension strip chart 24 is permanently and rigidly connected adjacent the beam 74, and the Y-dimension strip chart 26 is permanently and rigidly connected adjacent the beam 78 on the bridge assembly 12'. The position transducer 28 is attached to the bridge assembly 12' and senses the information defining the distance measurement increments on the strip chart 24. The transducer 30 is attached to the trolley assembly 18' and senses the information defining the distance increments along the strip chart 30. The mast 70 is permanently and rigidly connected to the trolley assembly 18'. Motors 82 and other conventional control devices are also connected to the trolley assembly 18' and are used in controlling the extension and position of the mast 70 and the various functions of the grapple assembly 72, under control of the computer processor 36 (FIG. 1).

Figure 3:
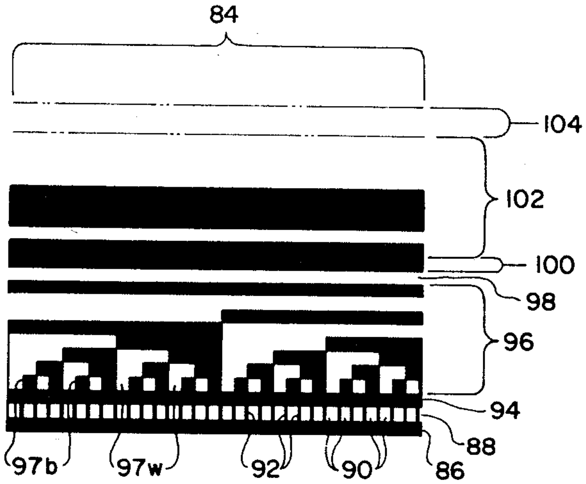
FIG. 3 is an enlarged plan view of a longitudinal segment of a binary coded bar or strip chart preferably included as a part of the control system shown in FIG. 1.

Details of the strip charts 24 and 26 are best understood by reference to a segment 84 of one of the strip charts 24 or 26, shown in FIG. 3. The information on each of the strip charts is preferably presented in a manner that will allow the information to be optically or electrically detected by the transducers 28 and 30 (FIG. 1). Optical information can be formed on the charts by known photographic processes. Each strip chart has a plurality of longitudinally extending parallel bars which collectively define information representative of each distance measurement increment longitudinally along the strip chart. The bars and segments of the bars are formed with different light reflectivity characteristics, such as those provided by white and black areas along the bars or segments of the bars. Each of the bars is of uniform transverse width.

A trigger bar 86 extends longitudinally along the leading edge of the strip chart. The leading edge of the strip chart is that transverse side where the position transducer begins sensing or scanning the information transversely across the strip chart. The trigger bar 86 is continuously black along its total length. Next sequentially adjacent the trigger bar 86 in the order in which the information is scanned is a sample bar 88. The sample bar 88 includes white sample segments 90 and black transition segments 92. The sample segments 90 alternate with the transition segments 92 along the length of the sample bar 88. The sample segments 90 are uniform in length and are positioned at evenly spaced intervals along the full length of the sample bar 88. Similarly, the transition segments 92 are uniform in length and are positioned at uniformly spaced intervals. Next sequentially adjacent the sample bar 88 in the scanning order is a first start bar 94 which is continuously black along its entire length. A first group 96 of eight parallel, longitudinally-extending data bars is next sequentially positioned from the first start bar 94 in the scanning order. Each of the data bars in the first group 96 define binary coded information uniquely indicative of each sample segment 90 of the sample bar 88, when the information of the data bars in the first group 96 is viewed transversely perpendicular with respect to the length of the strip chart through a point in a simple segment 90. Each of the data bars in the first group 96 thus includes equal length segments which alternate from black to white characteristics. White and black segments of the initial data bar adjacent the start bar are respectively referenced 97*w* and 97*b*. The length of the segments of the initial data bar adjacent the first start bar 94 through the last scanned of the data bars in the group 96 increases by the multiple of two from one data bar to the next sequentially scanned data bar, thus defining the typical binary code from the least significant digit to the most significant digit. The transitions from one segment to the other segment along each of the data bars of the first group 96 occur at positions directly transversely perpendicular relative to the various bars across the strip chart from each of the transition segments 92 of the sample bar 88. Consequently, the information presented by the black and white segments of the data bars of the first group 96 is fully presented transversely perpendicular across the strip chart from each of the sample segments 90.

The first group of data bars 96 is immediately followed in the scanning order by a continuously white first stop data bar 98. A second start bar 100 follows the first stop data bar 98 in scanning order. The second start data bar 100 is continuously black along its entire length. A second group 102 of eight more data bars is presented in scanning order next following the second start data bar 100. Although not fully shown in FIG. 3, each of the data bars of the second group 102 includes equal length segments which alternate in white and black light reflectivity characteristics similar to the segments of the first group 96, except that the length of the segments of each data bar in the second group is greater than the length of any segment in the first group 96. Similar to the first group 96 of data bars, transitions between segments of each of the data bars in the second group 102 also occurs at positions transversely perpendicular from each of the transition segments 92. The purpose of this second group 102 of data bars is to continue the binary code significant digits past the number of significant digits which can be coded by the first group of data bars 96. A continuously white marginal area of the strip chart sequentially past the last data bar of the group 102 defines a second stop data bar 104 on the strip chart. The second stop data bar 104 is the last bar of the strip chart which is sequentially scanned.

Each of the bars and each of the segments of certain of the bars are arranged on the strip chart to advantageously prevent spurious and unreliable signals and to make the signals obtained by photoelectrically detecting the bars and bar segments more compatible with certain electronic elements which supply the signals to the computer processor 36 (FIG. 1). All of the transitions between segments of the data bars of the first group 96 and second group 102 occur at points transversely perpendicular from each of the transition segments 92 of the sample bar 88. As will become more apparent from the subsequent description of the transducers 28 and 30, signals obtained from a scan of the strip chart at a point transversely perpendicular from transition segments 92 will not be supplied to the computer processor. However, signals obtained from scans of the strip chart at points transversely perpendicular from the sample segments 90 will be supplied to the computer processor. During each scan, the eight data bars of the first group 96 are preceded by a start bar 94 and followed by a stop bar 98. Similarly, the eight data bars of the second group 102 are preceded by a black start bar 100 and followed by a white stop bar 104. The signals obtained by detecting the start bars 94 and 100 and by detecting the stop bars 98 and 104, facilitates the conversion of the eight data signals obtained from the data bars of the first and second groups 96 and 102 into parallel form. These functions, among others, are secured by the transducers 28 or 30.

Figure 4:
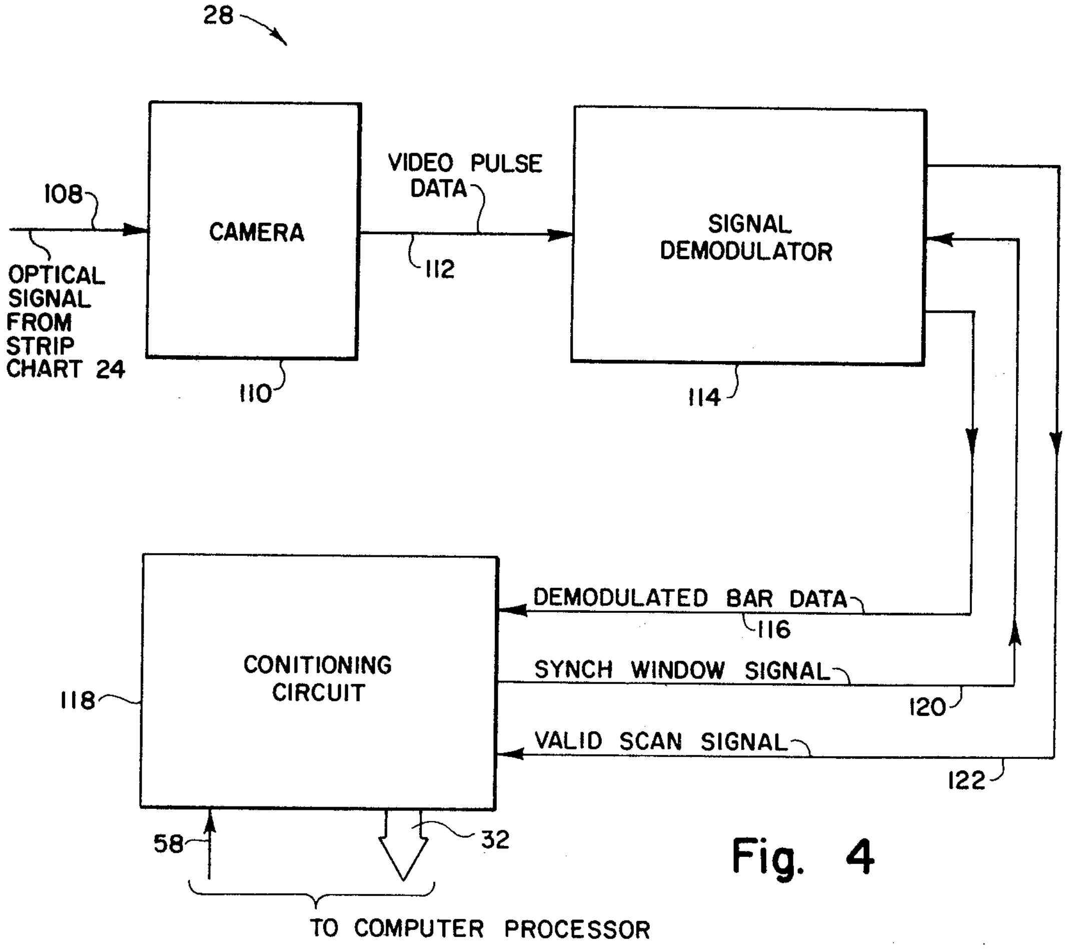
FIG. 4 is a block diagram view of the major elements of one position transducer included as a part of the control system shown in FIG. 1.

The basic elements of one of the transducers, e.g. 28, are illustrated in FIG. 4, although the basic elements of the other transducer 30 (FIG. 1) are the same as those illustrated in FIG. 4. The position transducer includes a camera 110 which periodically scans the strip chart and receives optical signals 108 from the bars and bar segments on the strip chart 24. The camera 110 includes photoelectric elements for converting the light levels from the optical signals 108 into electrical signals. The electrical signals are supplied on conductor 112 to a signal demodulator 114. The signals on conductor 112 are binary level pulse signals which represent the white and black areas associated with each of the bars and the segments of the bars of the strip chart previously described in conjunction with FIG. 3. The information present on conductor 112 is designated video pulse data. A signal demodulator 114 receives the video pulse data, demodulates the video pulse data into demodulated bar data generally representative of the whole of each bar, and presents the demodulated bar data on conductor 116 to a conditioning circuit 118. The conditioning circuit 118 utilizes the demodulated bar data and delivers to the signal demodulator 114 a synch window signal on conductor 120. The synch window signal on conductor 120 is utilized by the signal demodulator 114, in conjunction with the video bar data on conductor 112 to determine if the scan of the strip chart occurs at a point transversely perpendicular from one of the same segments 90 or from one of the transition segments 92 of the sample bar 88 (FIG. 3). If the scan occurs at a point transversely perpendicular of one of the sample segments 90, the signal demodulator 114 supplies a valid scan signal on conductor 122 to the conditioning circuit 118. If the camera 110 is scanning the strip chart at a position transversely perpendicular from one of the transition segments 92, the signal demodulator 114 will not supply a valid scan signal on conductor 122. The conditioning circuit 118 receives the valid scan signal 122 and utilizes it in conjunction with the demodulated bar data on conductor 116 to convert the demodulated bar data into related information signals suitable for presentation over the data bus 32 to the computer processor 36 (FIG. 1). However, should a valid scan signal 122 not be present on conductor 122, the conditioning circuit 118 will not present any information signals related to the demodulated bar data on the data bus 32.

Of course, the transducer 28 operates under control of the microprocessor by the various control signals delivered over the conductors 58 to the conditioning circuit 118. Although not shown, various control signals presented over conductors 58 are coupled to the camera 110 and signal demodulator 114 in a manner which will be apparent to those skilled in the art in view of the following detailed description of the transducer.

Figure 5:
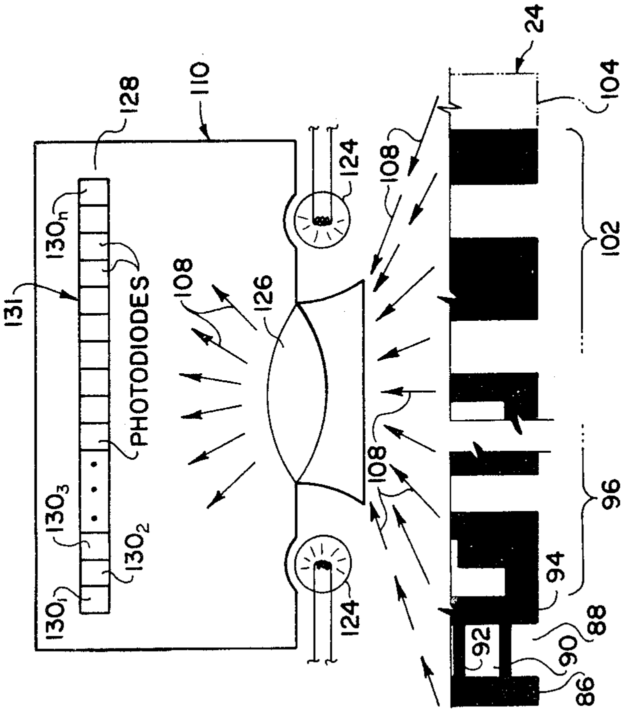
FIG. 5 is a generalized view schematically illustrating certain mechanical elements and the optical relationship of a camera of the transducer shown in FIG. 4 and a distance measurement increment of the strip chart shown in FIG. 3.

The optical arrangement of the camera 110 with respect to the strip chart is best understood from FIG. 5. The camera 110 is mounted to traverse a path parallel and adjacent to the strip chart 24. The strip chart, of course, is permanently and stationarily positioned adjacent one of the movement tracks over which the bride or trolley assembly moves. The camera 110 is connected to the bridge or trolley assembly and moves with the bridge or trolley assembly. The camera includes at least one but preferably two lamps 124 which provide light and direct that light directly onto the strip chart 24. The light intensity from the lamps 124 is substantially uniform over the full width of the strip chart. The light is reflected from the strip chart 24 and defines the optical signal 108 received by the camera 110. The light intensity reflected from the black and white areas of the strip chart defines a binary coded optical signal 108. The optical signal 108 is received by a focus lens 126 of the camera. The focus lens 126 passes the optical signal onto a linear array 128 of photodiodes $\mathbf{130}_1$, $\mathbf{130}_2$, $\mathbf{130}_3$, . . . $\mathbf{130}_N$. The lens 126 and position of the linear array 128 are arranged so that light reflected from a path transversely perpendicularly across the strip chart 24 will impinge on the photodiodes $\mathbf{130}_1$, $\mathbf{130}_2$, . . . $\mathbf{130}_N$ along the length of the array 128.

The magnification characteristics of the lens 126 are selected so that light is reflected from a path extending transversely across the bar chart of length greater than the transverse width of the bar chart. Any transverse shifting of the strip 24 along the movement path, with respect to the center of the lens 126, will still assure that optical signals 108 from a full transverse scan of the strip chart transversely perpendicular from a sample segment will fall on the photodiodes $\mathbf{130}_1$, $\mathbf{130}_2$, . . . $\mathbf{130}_N$. For this reason, it is desirable that the optical signals from the full width of the strip chart 24 be focused on a limited number of the total number N photodiodes, and those signals preferably be focused near the center of the linear array. For example, assuming a linear array of 256 photodiodes, it has been determined that use of the center 176 diodes allows sufficient flexibility for slight transverse shifting of the orientation of the strip chart 24 over its total length, which may be as much as hundreds of feet. The characteristics of the lens 126 are additionally selected to maintain the optical signal in focus on the linear array 128 with slight variations in focal distance from the lens 126 to the strip chart (vertically between lens 126 and strip chart 24 as shown in FIG. 5). Since the movement tracks 20 are typically highly machined and the rollers 14 and 22 (FIG. 1) include rotational elements of high tolerances, changes in the focal distance are typically not of great magnitude.

The transverse width of the linear array 128, i.e. the width of one photodiode, is considerably less than the length along the strip chart 24 of each sample segment 90. It is desirable to maintain this physical relationship even with any magnification that might result from the lens 126, so that only the information transversely perpendicular from each sample segment 90 will create a single optical effect on the linear array 128. For example, the transverse width of the linear diode may be one mil, and the length of the sample segment 90 along the strip chart may be ten mils. In this example, even a lens 126 having a magnification of 2.5 will still allow a scan of the strip chart only 2.5 mils in width, approximately four times the length of each sample segment. It is also desirable to cast essentially a uniform intensity of light along the full transverse width of the strip chart 24. Uniform intensity light will provide relatively uniform intensity levels from all of the similarly colored bars and segments of bars and will also provide a uniform difference of reflected light intensity between the black and white areas of the strip chart. Consequently, the intensity levels reflected from the strip chart and defining the optical signal 108 can be effectively utilized to determine whether white or black areas of different reflectivity are being observed by the camera. Under these constraints the information on the strip chart can be adequately photoelectrically detected by the camera 110.

Figure 6:
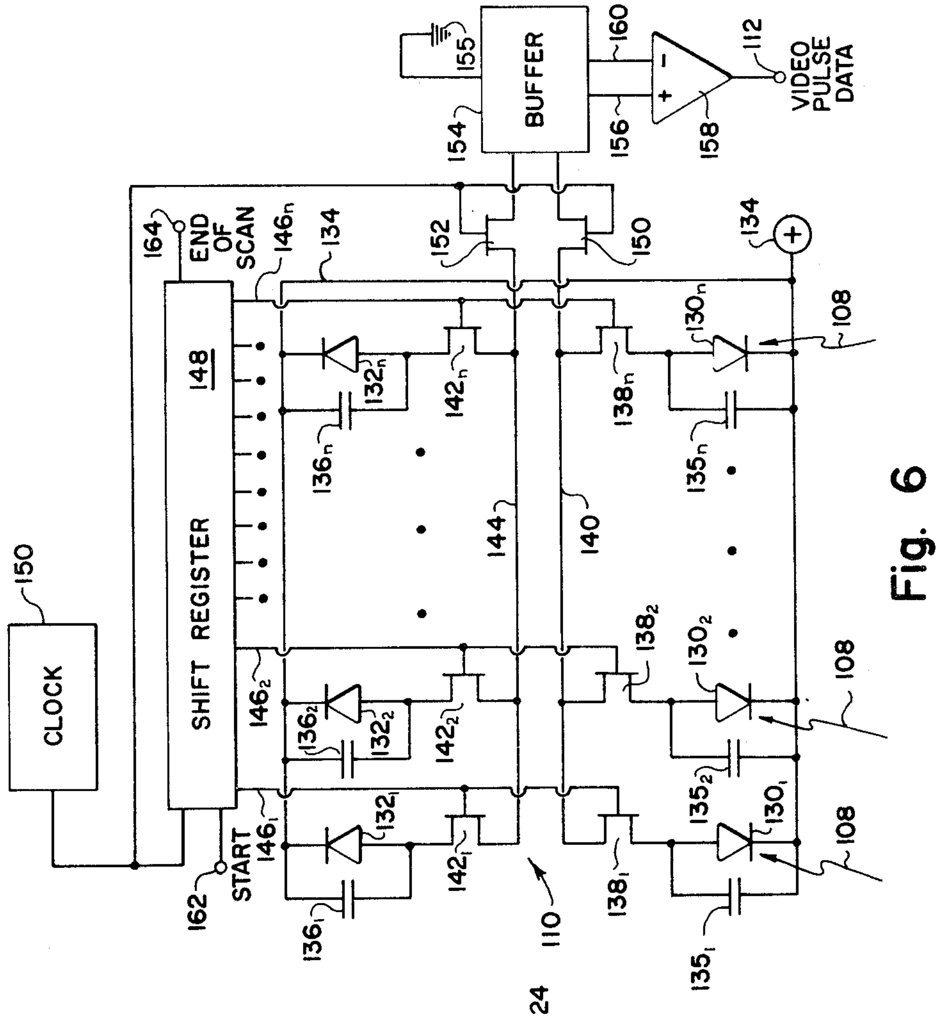
Fig. 6 PRIOR ART
FIG. 6 is a simplified schematic circuit diagram of a photodiode array device employed in the camera shown in FIG. 4. The physical arrangement of certain elements of the camera shown in FIG. 6 is also shown in FIG. 5.

Basic elements of the camera 110 which are responsive to the optical signal 108 and which provide the video pulse data on conductor 112 from the camera 110 are illustrated in FIG. 6. The plurality of photodiodes $\mathbf{130}_1$, $\mathbf{130}_2$, . . . $\mathbf{130}_N$ are arranged in a linear row on a single semiconductor chip. A transparent window 131 (FIG. 5) is formed through the chip to expose photodiodes $\mathbf{130}_1$ . . . $\mathbf{130}_N$ to the optical signal 108. For each photodiode $\mathbf{130}_1$, $\mathbf{130}_2$, . . . $\mathbf{130}_N$, a conventional dummy diode $\mathbf{132}_1$, $\mathbf{132}_2$, . . . $\mathbf{132}_N$ is provided. Each of the dummy diodes has similar electrical characteristics to the photodiode. The dummy diodes are hidden behind an opaque mask of the semiconductor chip and are not exposed to light. Both the photodiodes and the dummy diodes are electrically connected to a supply 134. Capacitors $\mathbf{135}_1$, $\mathbf{135}_2$, . . . $\mathbf{135}_N$ are connected in parallel with each of the photodiodes $\mathbf{130}_1$, $\mathbf{130}_2$, . . . $\mathbf{130}_N$, respectively. Similarly, capacitors $\mathbf{136}_1$, $\mathbf{136}_2$, . . . $\mathbf{136}_N$, are connected in parallel with each of the dummy diodes $\mathbf{132}_1$, $\mathbf{132}_2$, . . . $\mathbf{132}_N$, respectively. Each of the capacitors $\mathbf{135}_1$, $\mathbf{135}_2$, . . . $\mathbf{135}_N$, and $\mathbf{136}_1$, $\mathbf{136}_2$, . . . $\mathbf{135}_N$ is of the same value. One photodiode recharge switch $\mathbf{138}_1$, $\mathbf{138}_2$, . . . $\mathbf{138}_N$, respectively, connects each photodiode $\mathbf{130}_1$, $\mathbf{130}_2$, . . . $\mathbf{130}_N$ to a photodiode recharge conductor 140. Similarly, one dummy diode recharge switch $\mathbf{142}_1$, $\mathbf{142}_2$, . . . $\mathbf{142}_N$ respectively connects each dummy diode $\mathbf{132}_1$, $\mathbf{132}_2$, . . . $\mathbf{132}_N$ to a dummy diode recharge conductor 144. The gates of the associated photodiode and dummy diode switches $\mathbf{138}_1$ and $\mathbf{142}_1$ are connected to an electrical conductor $\mathbf{146}_1$ which connects to the first output terminal of a shift register 148. Similarly, the gates of the second pair of associated diode switches $\mathbf{138}_2$ and $\mathbf{142}_2$ are connected through a second conductor $\mathbf{146}_2$ to the second output terminal of the shift register 148. The same arrangement is provided for each sequential output terminal of the shift register and each associated pair of diode switches up to and including the last pair of associated diode switches $\mathbf{138}_N$ and $\mathbf{142}_N$, which are connected through the last conductor $\mathbf{146}_N$ to the last output terminal of the shift register. A clock 150 supplies clock pulses to the shift register 148 and to recharge switches 150 and 152 respectively connected to the recharge conductors 140 and 144. The recharge switches 150 and 152 conduct current from the recharge conductors 140 and 144 respectively to a buffer 154. Current flowing from the recharge line 140 through the buffer 154 to reference potential 155 generates a signal from buffer 154 which is applied on conductor 156 to a differential amplifier 158. Similarly, current flowing from recharge conductor 144 through the buffer 154 to reference potential 155 creates a signal applied on conductor 160 to the differential amplifier 158.

The photodiodes $130_1$, $130_2$, . . . $130_N$ become conductive of current when light impinges on the photodiodes. Consequently, when light impinges on one photodiode, for example photodiode $130_1$, the capacitor $135_1$ connected and parallel with the photodiode is discharged. Similarly, any other photodiode which receives light causes its associated capacitor to discharge. Those photodiodes which do not receive light do not become conductive, and the capacitors associated with those photodiodes are not discharged.

The process of converting the optical signals 108 to the video pulse data on conductor 112 begins with the application of a start pulse applied to conductor 162 of the shift register 148. After the start pulse on conductor 162, the clock 150 sequentially shifts one high signal at a time on the output conductors $146_1$, $146_2$, . . . 146N. After a full scan of the photodiodes, as defined by sequentially shifting the high level signal to each of the N outputs, a high level end-of-scan signal appears on conductor 164. The end-of-scan signal indicates that the photodiode array can again be scanned. The clock frequency 150 is also conducted to the gates of the recharge switches 150 and 152, thereby closing the switches 150 and 152 to allow current to be conducted to the buffer 154 from the recharge conductors 140 and 144 as the individual pairs of diode switches become conductive.

Upon application of a high output on the first output conductor $146_1$ capacitors $135_1$ and $136_1$ will be recharged to the extent that they have been discharged by photocurrent flowing through the photodiode $130_1$ or current flowing through the dummy diode $132_1$, respectively. Of course, capacitor $136_1$ will retain substantially all of its charge because dummy diode $132_1$ does not become substantially conductive because it is hidden behind an opaque mask. Current will flow from the supply 134 through the capacitor $135_1$ and photodiode switch $138_1$ to the extent that the capacitor $135_1$ may have been discharged by photocurrent created by the optical signal impinging on the photodiode $130_1$. The recharge current is conducted through conductor 140, the switch 150 and into the buffer 154. A signal 156 representative of the recharge current appears on conductor 156. Similarly, any recharge current for the dummy capacitors $136_1$ will create a signal on conductor 160.

If a low intensity light or no light reflected from a black segment of the strip chart impinges on the photodiodes $130_1$, the recharge current conducted through capacitor $135_1$ will essentially be the same as the recharge current conducted through capacitor $136_1$. Accordingly, the signals on conductors 156 and 160 will essentially be the same and the output of the differential amplifier 158 on conductor 112 will essentially remain in the low level. However, if high intensity light has impinged on photodiode $130_1$, a signficantly greater recharge current will flow through conductor 140 then through conductor 144. Consequently a substantially larger signal will appear on conductor 156 than on conductor 160, causing the output of the differential amplifier 158 to attain a high level.

In a similar manner the clock 150 shifts a high signal to each of the outputs of the shift register. Each photodiode in the linear array is sequentially sampled in this manner and a pulse is provided on conductor 112 representative of the light which has impinged on the photodiode which is being sampled in sequence. Consequently, the video pulse data appearing on conductor 112 is a series of signal level pulses equal in number to the number of photodiodes in the linear array. A high signal level of each pulse is representative of the fact that light has impinged on the particular photodiode from which the pulse was generated, while a low signal level on the conductor 112 is representative of little or no light impinging on the photodiode, as would result from light reflected from a black area of the strip chart.

Figures 8A, 8B, 8C, 8D, 8E, 8F, 8G, 8H, 8I, 8J:
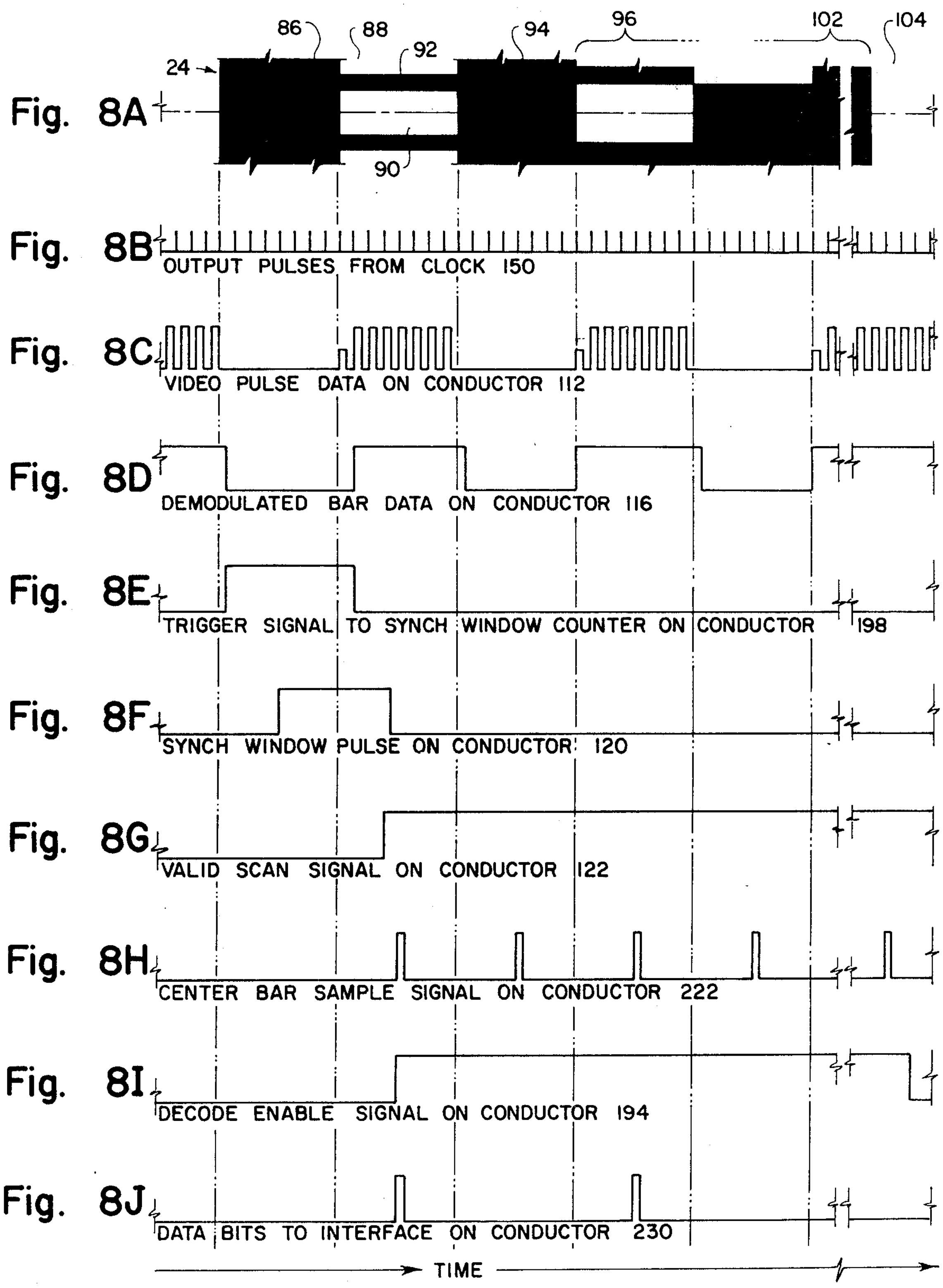
FIGS. 8A through 8J are, respectively, a transverse segment of a portion of a strip chart illustrating a distance measurement increment and a series of wave form diagrams of signals appearing as various points in the camera, signal demodulator and conditioning circuit illustrated in FIGS. 4, 6 and 7.

A wave form diagram of the video pulse data present on conductor 112 is illustrated in FIG. 8C. The video pulse data shown in FIG. 8C is derived in relation to a scan of one segment of the bar chart 24 illustrated in FIG. 8A. FIG. 8B represents the pulses from clock 150 which cause a high level output signal to be shifted sequentially from one output of the shift register 148 to another. Apparatus similar to that discussed in conjunction with FIG. 6 is sold under the trademark RETICON by Reticon Corp. of Sunnyvale, Calif.

In addition to the optical limitations and constraints previously discussed, it is also desirable that light reflected from the full transverse width of each of the bars of the strip chart impinge a plurality of photodiodes. In the examples shown in FIGS. 8A to 8J, eight sequentially aligned photodiodes are arranged to receive the light reflected from the full width of each of the bars of the strip chart 24. Consequently, a scan of the photodiodes at a time when they are receiving light reflected from a center line through the sample segment 90 will result in eight sequential high level pulses on conductor 112 from each white area of a bar, and will result in eight sequential low level pulses, which may be no signals at all, from those black areas of bars which reflect little or no light.

Sensing and decoding more than one pulse from each bar provides more reliable decoding or sampling of the strip chart. More than one sequential pulse of the same level will represent the information on the strip chart. This is particularly important because in certain instances the movement of the camera relative to the bar chart may create aberrant video pulse data at points where the data bars experience transitions. For example as the camera moves over a transition, an output is produced which appears to be neither black nor white. The pulses on conductor 112 will progressively increase or decrease in size as the transition goes from black to white or white to black respectively. These transitions and other aberrances become more significant the faster the bridge and trolley assemblies move the camera with respect to the stationarily positioned bar chart. For the reason of assuring relatively reliable signals during rapid movement of the camera relative to the strip chart, it is also desirable to obtain a plurality of separate readings over the length of each sample segment 90 of the sample bar 88. The number of readings obtained is dependent upon the frequency of the clock 150, shown in FIG. 6, and the rapidity with which the start pulses are delivered to conductor 162 of the shift register 148 after the end of each scan as signified by a high level signal on conductor 164, and the movement rate of the bridge and trolley assemblies.

Figure 7:
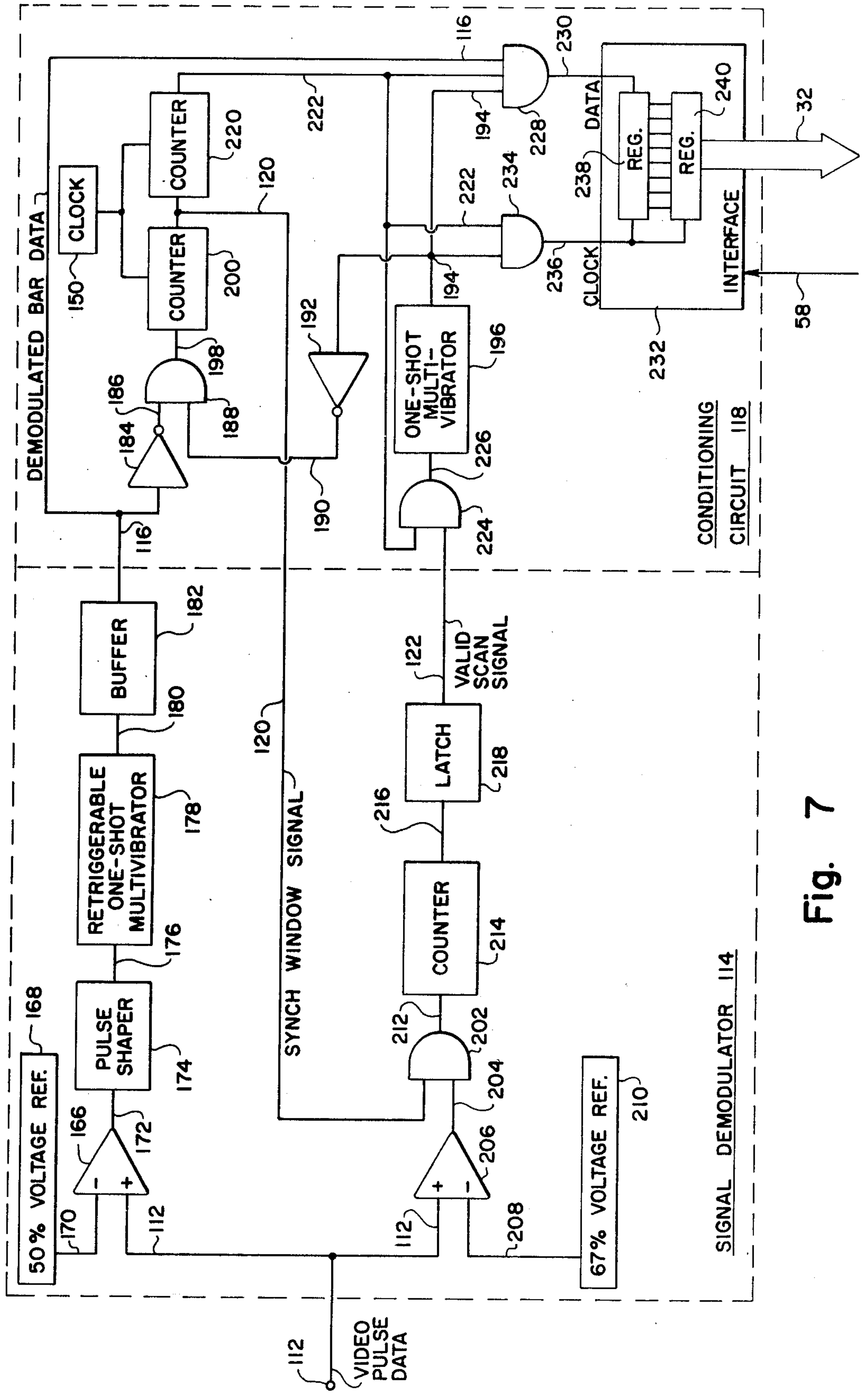
FIG. 7 is a simplified schematic circuit diagram of the major elements of a signal demodulator and a conditioning circuit of the transducer shown in FIG. 4.

The signal demodulator 114 and the conditioning circuit 118 include circuit elements which prevent the conducting of invalid or aberrant data over the data bus 32 to the computer processor 36, as will be described in conjunction with FIG. 7. The video pulse data on conductor 112 is conducted to a comparator or differential amplifier 166 of the signal demodulator 114. Another input to the differential amplifier 166 is provided by a voltage reference 168. By adjusting the intensity of the lamps 124 (FIG. 5) associated with the camera, it is possible to predetermine the voltage level difference between high and low level video data pulses on conductor 112. For example, the proper amount of intensity would provide a two volt differential between a high-level pulse related to the light reflected from a white area and a low-level pulse representative of the light reflected from a black area of the strip chart. The voltage reference 168 is set at a value generally approximating 50% of this voltage differential between high and low level signal pulses of the video pulse data. Differential amplifier 166 will provide an output pulse on conductor 112 only when the video pulse data on conductor 172 exceeds the 50% level applied on conductor 170 from the 50% voltage reference 168. Thus, pulses appearing on conductor 172 represent light reflected from an area of the strip chart which is more white than black. The output pulses on conductor 172 from the differential amplifier 166 are applied to a pulse shaper 174. The pulse shaper 174 provides uniformly sized and shaped pulses on conductor 176 in response to the application of each pulse applied on conductor 172. Each pulse on conductor 176 triggers a retriggerable one shot multivibrator 178. The time constant of the multivibrator 178 is adjusted to a predetermined value which is approximately the time interval of one and one half intervals of the pulses of the clock 150 (FIG. 6). With such a time constant, the continual application of next sequential same-level pulses on conductor 176 keeps the retriggerable multivibrator 178 triggered thus providing a high output on conductor 180. However, should a low level pulse be present on conductor 176, the output of the multivibrator 178 will go low at a point in the middle of the interval when the low level input pulse on conductor 176 is present. A buffer 182 receives the signal on conductor 180 and applies it on conductor 116. The signal present on conductor 116 is the demodulated bar data which generally represents a high signal during the duration of those video data pulses on conductor 112 which are of a level greater than 50% of the voltage difference between the high and low level signal pulses. The wave form of the demodulated bar data is illustrated in FIG. 8D, in relation to the video pulse data in FIG. 8C. By comparing FIGS. 8C and 8D the demodulated bar data on conductor 116 remains high so long as the pulses on conductor 112 exceed the 50% level.

The demodulated bar data on conductor 116 from the signal demodulator 114 is inverted by an inverter 184 and applied to conductor 186. Conductor 186 is one input to an AND gate 188. The other input to AND gate 188 is received on conductor 190 from an inverter 192. The input to inverter 192 is obtained from conductor 194 upon which the output signal of a one shot multivibrator 196 is applied. The multivibrator 196 is reset to a low level at the end of each scan of the linear array of photodiodes by a conventional reset signal not specifically illustrated. The signal on conductor 190 is therefore high at the beginning of each scan. During any white marginal area of the strip chart preceding the black trigger bar 86 (FIG. 8A) the demodulated video data on conductor 116 is high. Once the scan encounters the black trigger bar signifying the start of a scan, the demodulated bar data goes low, and the low level signal is inverted by inverter 184. Both input signals to AND gate 188 are high at this time and the output signal of AND gate 188 on conductor 198 goes high, as shown in FIG. 8E. Upon being triggered by the high level signal on conductor 178, a counter 200 counts clock pulses from the clock 150. A high level output signal, which defines the synch window signal shown in FIG. 8F, is supplied by counter 200 on conductor 120 after the counter 200 counts a predetermined number of pulses from the clock 150. The number of pulses which the counter 200 counts before providing the synch window signal is predetermined such that the synch window signal goes high approximately in the middle of the scan of the trigger bar 86 of the strip chart 24. This arrangement is illustrated in FIGS. 8F, 8E, 8B and 8A. In the particular example illustrated in FIG. 8F, the counter 200 counts four clock pulses after the trigger signal on conductor 198 goes high. The trigger signal on conductor 198 goes high one-half of a clock pulse after the demodulated video data on conductor 116 goes low, as provided by the time constant of multivibrator 178. Accordingly the high level synch window pulse on conductor 140 goes high four clock pulses (FIG. 8F) after the optical signal reflected from the trigger bar 86 has begun to be decoded.

The counter 200 also has the characteristics of providing the high level synch window signal on conductor 120 for only a second predetermined number of pulses from clock 150 during each scan. After the counter has counted the second predetermined number of pulses after being triggered, the synch window signal goes low and remains low throughout the remainder of the scan. The counter 200 will not again supply a high level synch window signal during that particular scan until it is reset. The counter 200 is reset at the beginning of each scan by a conventional reset signal not specifically shown. In the example shown in FIG. 8E, the synch window signal remains high for approximately eight pulses from clock 150, as shown by comparing FIG. 8E with FIG. 8B. Consequently, the synch window signal terminates and goes low in the middle of the scan of the sample bar 88 of the strip chart 24 (FIG. 8A).

The purpose of the synch window signal is to determine if the scan of the photodiodes is occurring at a time when they are receiving light reflected from a point on the strip chart transversely perpendicular from a sample segment 90 of the sample bar 88 or whether the scan is occurring at a time when light is reflected from a point transversely perpendicular through a transition segment 92. If the scan is occurring through a transition segment 92, the demodulated bar data obtained will not be coupled to the computer processor over the data bus 32 because the valid scan signal on conductor 122 will not be present.

To obtain the valid scan signal, the synch window signal on conductor 120 is applied to one input signal to AND gate 202 and is gated by the AND gate 202 with another input signal supplied on conductor 204 from a differential amplifier 206. Video pulse data on conductor 112 is applied as one input signal to the differential amplifier 206. The other input signal to the differential amplifier 206 is applied on conductor 208 from a voltage reference 210. The voltage level at which the reference 210 is adjusted is predetermined to be two-thirds of the voltage difference of the pulses obtained from light reflected from white and black areas of the sample bar. Pulses appearing on conductor 204 are those video data pulses whose analog level is above two-thirds of the total intensity difference between light reflected from black and white areas of the strip chart. By setting the voltage level of reference 210 at the two-thirds value, there is a high assurance that only those video data pulses generated from an essentially purely white sample segment 90 will be coupled through the differential amplifier 206 and applied to AND gate 202 over conductor 204. By gating the pulses applied on conductor 204 with the synch window signal on conductor 120 at the AND gate 202, only the first sensed half of the transverse width of the sample segment 90 will be sensed. Consequently, if the first few video data pulses from a sample segment 90 do not attain the two-thirds level, the remainder of the scan of the strip chart will be disregarded. As shown in FIG. 8E, the synch window signal goes low after the first half of the sample bar is scanned.

The pulses applied on conductor 212 from AND gate 202 cause a counter 214 to count. Once counter 214 has counted a predetermined number of pulses, a high output signal is applied on conductor 216. In the example shown in FIG. 8G, a high level signal on conductor 216 will be present after the application of two pulses on conductor 212 to counter 214. If two pulses are not applied to the counter 214 before the synch window signal on conductor 120 goes low (FIG. 8F) the counter 214 will not apply a high signal on conductor 216 during the remainder of the scan of the strip chart. However, once a high signal is applied on conductor 216, the output signal of a latch 218 on conductor 122 goes high, and the output of latch 218 defines a high level valid scan signal on conductor 122, shown in FIG. 8G. The presence of the high level valid scan signal allows the demodulated video data on conductor 116 to be presented to the computer processor 36. The predetermined number of clock pulses counted by counter 214 before supplying the high output on conductor can not exceed the number of clock pulses occurring between the beginning of the scan of the sample bar and the termination of the synch window signal.

In addition to being gated with the video pulse data on conductor 112, the sync window signal on conductor 120 also triggers a counter 220. Once triggered, counter 220 continues to count clock pulses from clock 150 until reset at the end of the scan. The counter 220 applies an output pulse on conductor 222 after counting each group of a predetermined number of clock pulses. The predetermined number of clock pulses counted by counter 220 is that number of clock pulses necessary to generate a center bar sample pulse timed to occur at approximately the middle of each bar of the strip chart subsequent from the sample bar 88 in the scanning order. The center bar sample signal is applied on conductor 220 and is illustrated in FIG. 8H. In the example shown by FIG. 8H, counter 220 delivers a center bar sample pulse or signal after each group of eight count pulses from the clock 150.

The center sample bar signals of FIG. 8H on conductor 222 are conducted to an AND gate 224. The other input signal to the AND gate 224 is the valid scan signal (FIG. 8G) on conductor 122. The first high pulse of the center bar sample signal, in conjunction with the valid scan signal, causes a high output signal on conductor 226 from AND gate 234 which triggers the one shot multivibrator 196. Once triggered, the multivibrator 196 provides a high output decode enable signal on conductor 194, as shown in FIG. 8I. The multivibrator 196 maintains the decode enable signal on conductor 194 for a predetermined time generally corresponding to slightly less than all of the clock pulses necessary to complete a full scan of the strip chart through the last data bar of the second group 102. The decode enable signal remains high sufficiently long so that the center of the last data bar of the group 102 can be optically sensed and electrically decoded.

The demodulated bar data present on conductor 116, the center bar sample signals present on conductor 222 and the decode enable signal present on conductor 194 are each applied as input signals to an AND gate 228. Upon the presence of all three of these high level signals, a high level signal is applied on conductor 230 to a data input of a conventional interface 232. The center bar sample signal on conductor 222 and the decode enable signal on conductor 194 are applied as input signals to an AND gate 234. The presence of high signals on conductors 194 and 222 causes AND gate 234 to apply a high level signal on conductor 236 to the clock input of the interface device 232. High and low data bits shown in FIG. 8J are defined by the output signal level on conductor 230, at the times when high output pulses are present on conductor 236.

The well known basic function of the asynchronous interface 232 is to receive serial bit data and convert that serial bit data into parallel form suitable for use by a computer processor. The interface 232 shifts data bits from conductor 230 into a first internal register 238 under the influence of clock pulses on conductor 236. Once the first internal register 238 is filled with data bits, the information filling the first register is shifted in parallel form to a second internal register 240. Thereafter, the first internal register 238 is again filled with serial data bits from conductor 230. Once both internal registers 238 and 240 are filled, the computer processor is signalled and, at the appropriate time, the parallel information from the internal register 240 is first supplied over the data bus 32 to the computer processor and is followed by the parallel information from the register 238.

One type of interface 232 which may advantageously be used with the system of the present invention is the type which initially requires a low level data signal on conductor 230 to initiate the serial shifting of a predetermined number of data bits into the internal registers. Typically, the first internal register 238 will have the capacity to receive eight data bits. After the first internal register 238 is filled with data bits, a high level signal on conductor 230 will cause the information to be shifted from the first internal register to the second internal register 240. Subsequently, a second low level data signal on conductor 230 will allow a second group of eight data bits to fill the first internal register 238. The arrangement of the black start bars 94 and 100, followed by eight data bars 96 and 102, which in turn are followed by white stops bars 98 and 104 directly provide the signals for operating the internal registers of the interface 232 in their intended manner.

Referring back to FIG. 7 it is noted that the decode enable signal on conductor 194 is inverted by inverter 192 and supplied as one input to AND gate 188. Once the decode enable signal on conductor 194 attains a high level, the signal on conductor 190 becomes low. The signal on conductor 190 remains low throughout the remainder of the scan of the strip chart. Thus, even though the signal on conductor 116 may alternate between high and low, the signal on conductor 198 remains low for the remainder of the scan. The low level signal on conductor 198 disables counter 200 and prevents the synch window signal from going high during the remainder of the scan of the strip chart. Accordingly, there is no possibility that AND gate 202 will supply a high level signal on conductor 212, thereby creating a valid scan signal on conductor 122, unless the appropriate number of video pulses on conductor 112 have attained the predetermined two-thirds intensity value during the first half of the scan of the sample segment 90 of the sample bar 88. By this arrangement, there is an assurance that only the information transversely perpendicular from sample segments 90 will be decoded and utilized within the system of the present invention.

Referring back to FIGS. 1 and 2, the information obtained from the transducers 28 and 30 is utilized by the computer processor for a variety of different purposes, most of which are known in the art. With respect to a nuclear manipulator crane 62, for example, the information is utilized to position the mast 70 at particularly addressed core receptacles 66 for purposes of manipulating the nuclear elements within the receptacles 66. The manipulator device may be moved to any predetermined address that may be manually selected by the system input control 40, or it may be automatically moved to predetermined number of positions selected by computer programming. Programs controlling the computer processor 36 can select the shortest distance for point to point movement of the device. Obstacles and protected areas can be isolated to prevent the manipulator device from moving into those predetermined areas. The display 42 can graphically display the direction and point to point movement of the manipulator device with respect to a visual or graphic presentation of all areas in which the device can move. Furthermore, the use of color cathode ray tubes as part of the display 42 facilitates easy comprehension of the nature of the operations being performed. The programs controlling operation of the computer processor 36 are known in the art and have been developed andin conjunction with the prior art nuclear manipulator cranes utilizing an initial reference position and the incremental movement decoders and the like which have been previously described.

Although the present invention has been shown and described with a degree of particularity, the preferred description has been made by way of example only. The invention itself, is defined by the scope of the appended claims.

What is claimed is:

1. In an automated device operative to move along at least one movement track and having motor means for moving the automated device along the movement track, an improved control system for controlling the movement and position of the automated device along the movement track comprising:

means defining a chart having a width and a length and stationarily positioned transversely adjacent the movement track along a predetermined operative portion of the movement track over which the automated device is to be movably controlled, the length of the chart extending along the movement track and the width of the chart extending transversely with respect to the movement track, said chart having a radiation reflective code extending across a portion of the width of the chart and along the operative length of the chart which defines the length of the chart and hence the operative portion of the movement track into a plurality of distance increments, the code further defines each distance increment by a unique predetermined pattern of radiation reflected from the code at each distance increment;

radiation source means for emanating radiation onto the chart at a position adjacent the automated device as the automated device moves along the movement track, the radiation reflected from the code at each distance increment defining the predetermined pattern of reflected radiation unique to that distance increment;

camera means attached to and carried by the automated device during movement along the movement track relative to the chart, said camera means receptive of radiation from said source means reflected in a scanning path extending fully across and beyond the transverse width of the chart to assure reception of the predetermined pattern of radiation reflected from the code at each distance increment under conditions of shifts in transverse position of the chart relative to the movement track;

a part of said code including means reflectively indicative of the beginning and the ending of the transverse width of the code at each distance increment;

said camera means further including means for converting each predetermined pattern of reflected radiation into an increment signal uniquely indicative of the particular distance increment from which the predetermined pattern of reflected radiation was reflected; and processor means including a memory and an input control means for entering into said memory at least one information signal, each information signal corresponds to an increment signal corresponding to a distance increment along the operative portion of the track, said processor means being connected to said camera means to receive each increment signal from said camera means, said processor means further operatively controlling said motor to move said automated device along the movement track in predetermined relation to the information signal and each increment signal supplied by said camera means.

2. An invention as defined in claim 1 wherein:

said chart is an elongated strip chart which includes a plurality of parallel bars extending along the length of the chart, a lesser plurality of said bars defines a group of data bars, two other of said bars define a stop bar and a start bar, respectively, and one other of said bars defines a sample bar;

each of said data bars include equal length sequential segments of alternately different radiation reflectivity characteristics, the reflectivity characteristics of the plurality of data bars defines the predetermined pattern of reflected radiation for each distance increment in binary code when viewed across the width of said strip chart perpendicular with respect to the length of said bars, transitions from one segment to another sequential segment along each data bar occur at transitions between distance increments along said strip chart;

said group of data bars are preceded and followed by the start bar and the stop bar respectively across the width of the strip chart, the start bar has a consistent radiation reflectivity characteristic along its entire length, and the stop bar has a different consistent radiation reflectivity characteristic along its entire length;

the sample bar includes a plurality of equal length sample segments of one radiation reflectivity characteristic and a plurality of equal length transition segments of a different radiation reflectivity characteristic, the sample segments alternate in position with the transition segments along the length of the sample bar, and each transition segment is positioned transversely perpendicular with respect to the length of the data bars at the transitions between segments of the data bars; and the predetermined pattern of reflected radiation received by said camera means from the scanning path extends across the width of said strip chart transversely perpendicular with respect to the length of said bars, and the scanning path has a dimension extending along the length of said strip chart which is less than the length of each sample segment of said sample bar.

3. An invention as defined in claim 2 wherein:

said camera means is responsive to radiation reflected from each of said plurality of bars of said strip chart and supplies separate bar signals corresponding to each bar of said strip chart and indicative of the radiation reflectivity characteristics of each of said bars and segments thereof; and said camera means further supplies a start bar signal and a stop bar signal indicative of the beginning and the end, respectively, of the group of data bar signals.

4. An invention as defined in claim 3 wherein:

the plurality of bars of said strip chart further include a trigger bar in addition to those bars aforementioned, and the trigger bar extends along one transverse outer side of the plurality of bars, and the stop bar extends along the opposite transverse outer side of the plurality of bars; and said means of said code for indicating the beginning and the ending of the full transverse width of the code on the strip chart comprise the trigger and stop bars, respectively.

5. An invention as defined in claim 4 wherein the radiation emanated from said radiation source means is light, and the radiation which the code of said chart reflects is light, and said camera comprises a linear array of photodiodes operatively receiving to light reflected in the scanning path from the code of said chart and converting the reflected light into the increment signal, and the increment signal is electrical.

6. An invention as defined in claim 5 wherein said plurality of bars of said code are located on said strip chart from one transverse side to the other transverse side in the following sequential order:

(a) the trigger bar, (b) the sample bar, (c) the start bar, (d) the group of data bars, and (e) the stop bar.

7. An invention as defined in claim 6 wherein said plurality of bars of said code further comprise in continuing sequential order:

(f) a second start bar which has the same light reflectivity characteristic along its entire length as the first start bar aforementioned;

(g) a second group of a plurality of data bars in addition to the group of data bars first aforementioned, the second group of data bars is similar to the first group except that the length of the shortest segment of any data bar of the second group is greater than the length of the longest segment of any data bar of the first group; and (h) a second stop bar which has essentially the same light reflectivity characteristic along its entire length as the stop bar first aforementioned.

8. An invention as defined in claims 6 or 7 wherein said camera means is included as part of a transducer means of said control system, and said transducer means comprises:

first means for supplying the separate bar signals corresponding to each bar of said strip chart and indicative of the light reflectivity characteristic of each bar and segments thereof, said first means supplying said bar signals in the same recited sequence that said bars are transversely positioned on said chart;

second means responsive to the trigger bar signal from said first means for delivering a synch window signal of time duration which terminates after said first means supplies the sample bar signal;

third means for gating the synch window signal with the sample bar signal and for supplying a valid scan signal if the sample bar signal is indicative of light reflected from a sample segment of the sample bar prior to termination of the synch window signal; and fourth means responsive to said valid scan signal for converting the sequence of data bar signals into a binary multi-digit electrical increment signal.

9. An invention as defined in claim 8 wherein said fourth means is further responsive to the start bar signal and stop bar signal from said first means.

10. An invention as defined in claim 9 wherein said third means includes comparing means for comparing the sample bar signal with a predetermined signal reference and preventing the supplying of the valid scan signal if the sample bar signal is less than the predetermined reference for a predetermined time prior to termination of the synch window signal.

11. An invention as defined in claim 10 wherein said first means further comprises:

means responsive to the light reflected from each bar of said chart in the scanning path for supplying a plurality of electrical pulses representative of the light reflectivity characteristics of each bar and segment thereof, each of said plurality of electrical pulses having a signal level representative of the light reflectivity characteristics of a partial portion of the width of each bar in the scanning path; and demodulator means responsive to the signal level of said electrical pulses, said demodulator means supplying the separate bar signals from said first means, said demodulator means supplying the separate bar signals at one signal level so long as the level of electrical pulses exceeds a predetermined threshold level and supplying the separate bar signals at a different signal level upon the level of said electrical pulses being less than the predetermined threshold level.

12. An invention as defined in claims 6 or 7 wherein for each bar signal said camera means supplies a plurality of electrical pulses, each electrical pulse having a signal level representative of the light reflectivity characteristic of a partial portion of the width of each bar in the scanning path; and further comprising:

demodulator means responsive to the occurrence and signal level of said electrical pulses for supplying the bar signal at one signal level so long as the signal level of said electrical pulses exceeds a first predetermined threshold level and for supplying the bar signal at a different level upon the signal level of said electrical pulses being less than the first predetermined threshold level, said demodulator means supplying one bar signal corresponding to each bar of said chart;

counter means responsive to the trigger bar signal from said demodulator means, for delivering a synch window signal of time duration which terminates approximately after said camera means supplies a number of electrical pulses representative of the light reflectivity characteristic of an initial transverse half width portion of said sample bar;

comparing means receptive of electrical pulses from said camera means, for comparing the signal level of each of the electrical pulses from said camera means with a second predetermined threshold level and for supplying those electrical pulses which have levels from said camera means exceeding the second predetermined threshold level and for terminating the supply of electrical pulses which have signal levels from said camera means less than the second predetermined level;

gating means receptive of the synch window signal and of the electrical pulses supplied from said comparing means, said gating means supplying a valid scan signal upon receipt of a predetermined plurality of electrical pulses during the time duration of said synch window signal; and interface means responsive to said valid scan signal and the bar signals from said demodulator means for converting said bar signals from said demodulator means into a binary, multi-digit electrical increment signal.

13. An invention as defined in claim 12 wherein:

said demodulator means supplies bar signals in the same sequence that said bars are transversely positioned on said chart.

14. An invention as defined in claim 13:

further comprising second counter means in addition to the counter means first aforementioned, said second counter means being receptive of said synch window signal for supplying a plurality of center bar signals occurring approximately at the time center of the bar signals supplied from said demodulator means; and wherein said interface means is further responsive to the center bar signals from said second counter means, said interface means converting each sequential bar signal into parallel form upon receipt of the center bar signal corresponding to the bar signal to be converted into parallel form.

15. An invention as defined in claim 1 wherein each distance increment is of equal length along the one movement track.

16. An invention as defined in claim 1 wherein said radiation source means is carried by said automated device.

* * * * *